United States Patent [19]
Perrin

[11] Patent Number: 5,207,733
[45] Date of Patent: May 4, 1993

[54] MATERIALS FOR USE IN PLANT PROPAGATION

[76] Inventor: Alan P. Perrin, The Cottage, Cartref Gwenyn, Cefn-y-Gwrych, Meliden, Prestatyn, Clwyd, Wales

[21] Appl. No.: 465,965

[22] Filed: Jan. 16, 1990

[51] Int. Cl.$^5$ ............................................. A01G 31/00
[52] U.S. Cl. ........................................... 47/87; 47/64
[58] Field of Search .................... 47/86, 87, 64, 73, 74

[56] References Cited

U.S. PATENT DOCUMENTS

| | | | |
|---|---|---|---|
| 3,826,041 | 7/1974 | King | 47/41.12 |
| 3,973,355 | 8/1976 | McKenzie | 47/86 X |
| 4,034,506 | 7/1977 | Kasahara et al. | 47/64 |
| 4,058,931 | 11/1977 | Vestergaard | 47/87 |
| 5,086,583 | 1/1992 | Breen | 47/40.5 |

FOREIGN PATENT DOCUMENTS 744538 7/1970 Belgium .
691498 5/1953 United Kingdom .

OTHER PUBLICATIONS

BR-8 *New Growth Medium*, American Can Company, Horticultural Products, Dec. 1969.

Primary Examiner—Carl D. Friedman
Assistant Examiner—R. Canfield
Attorney, Agent, or Firm—Anthony J. Casella; Gerald E. Hespos

[57] ABSTRACT

A low density (5–12 Kgs/M$^3$), rigid, unicellular (i.e. closed cell) expanded polyurethane foam is perforated through at least part of its thickness by mechanical means, resulting in a hydrophilic, heterocellular (open cell) foam, whereby to facilitate the passage of emergent plant roots and also to provide groups of enlarged voids (in contrast to the fine cell structure of the unmodified foam) so as to facilitate water absorption and retention.

16 Claims, 5 Drawing Sheets

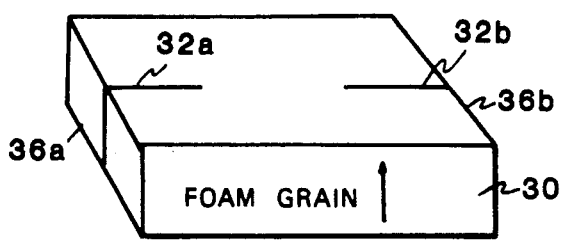
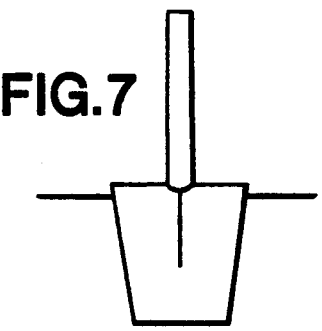
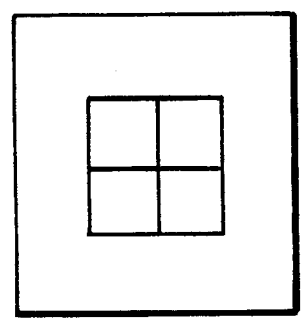
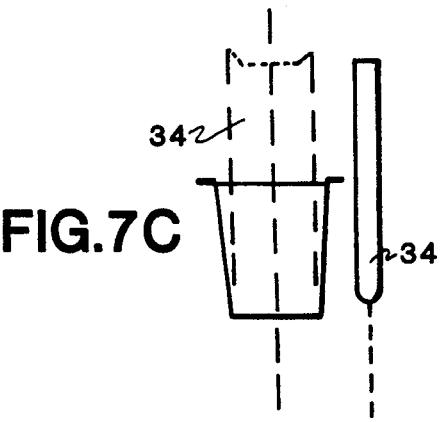
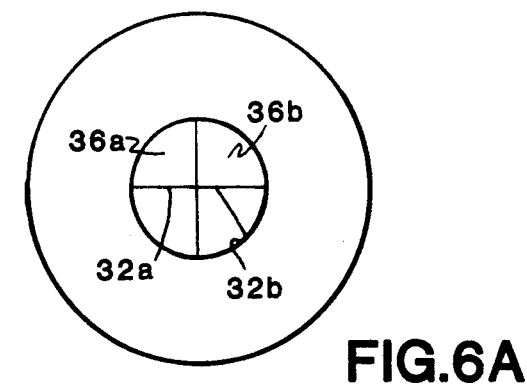
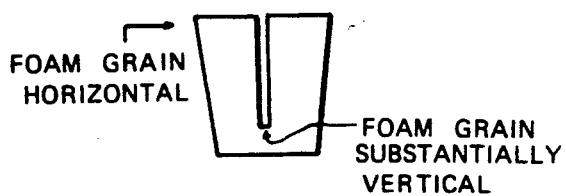
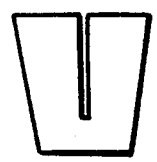

MATERIALS FOR USE IN PLANT PROPAGATION

The present invention is concerned with synthetic plastics materials for use in plant propagation, and in particular to such materials in modular form.

The traditional method of rooting cuttings and raising seedlings has involved the use of natural materials such as soil, peat and the like. In recent years, however, such natural materials have been replaced to a large extent by the use of synthetic plastics-based materials. These can be in a wide variety of forms, for example granular, shredded or cellular. It is with the latter, cellular type of material that the present invention is particularly concerned.

To provide the optimum conditions for either the successful rooting of cuttings or seed raising, a synthetic substrate must be permeable both to air and to the developing root structure. It must also be easily wettable by water and exhibit adequate levels of moisture retention.

Where the substrate is a continuous phase (as opposed to granular or shredded particles) cellular plastics material, for example phenolics or polyurethanes, permeability to air and the provision of adequate moisture (and moisture retention) are, to a significant extent, mutually exclusive objectives. This arises as a result of the poor capillarity of conventional cellular materials, consisting of substantially similar pore size.

It is a principal object of the present invention to provide an improved material for use in the rooting of cuttings and in the raising of seedlings, wherein the disadvantages of known synthetic materials are reduced significantly.

In accordance with the present invention there is provided a low density (5-12 kgs/m$^3$), rigid, unicellular (i.e. closed cell) expanded polyurethane foam which has been perforated through at least part of its thickness by mechanical means, resulting a hydrophilic, heterocellular (i.e. open cell) foam, whereby to facilitate the passage of emergent plant roots and also to provide groups of enlarged voids (in contrast to the fine cell structure of the unmodified foam), so as to facilitate water absorbtion and retention.

The perforations can be effected by any suitable means. For example, in one arrangement, perforation can be achieved by means of a toothed or pronged tool (or tools) which is forced into a body of unmodified foam. In another arrangement, the perforations can be achieved by the application of intermittent pulses of compressed air, applied via jets arrayed in groups and placed in intimate contact with the surface of unmodified polyurethane foam.

The invention is described further hereinafter, by way of example only, with reference to the accompanying drawings, in which:

FIG. 5 shows a block of foam formed in accordance with one embodiment of this invention;

FIG. 6 is a diagrammatic side section illustrating one use of the embodiment of FIG. 5;

FIG. 6a is a plan view of the structure formed in accordance with FIG. 6;

FIG. 6b shows the foam grain in the resulting unit.

FIG. 7 is a diagrammatic side section illustrating an alternative use of the embodiment of FIG. 5;

FIG. 7a is a diagrammatic plan view of the structure formed in accordance with FIG. 7;

Figure 8A:
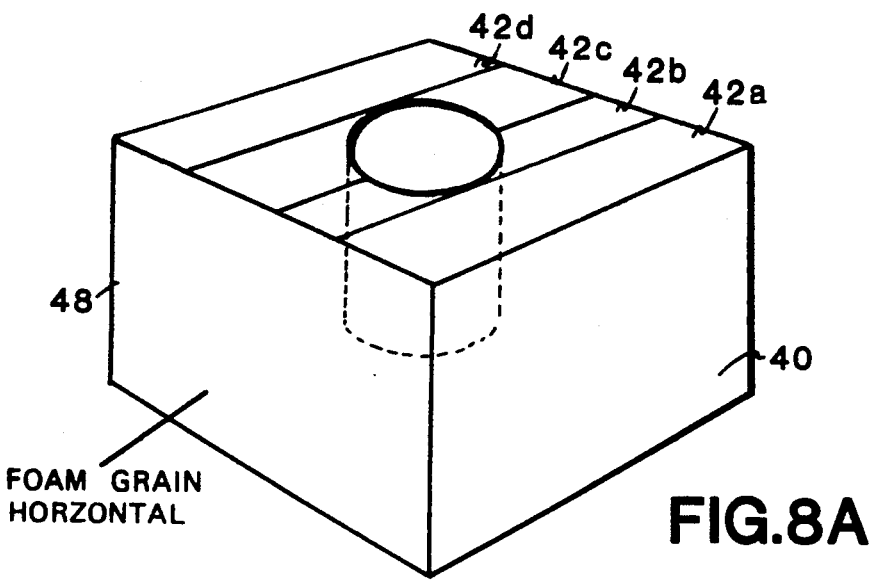
Figure 8B:
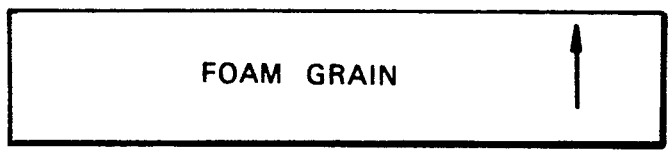
Figure 8C:
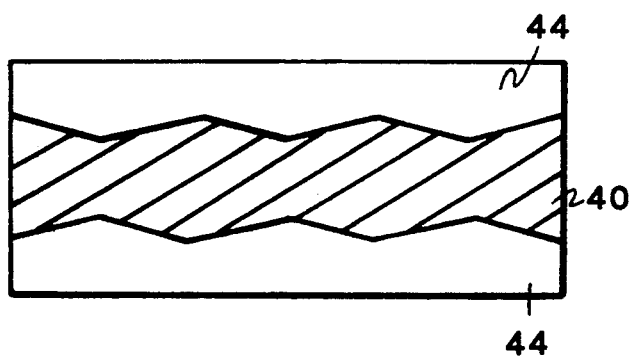
Figure 8D:
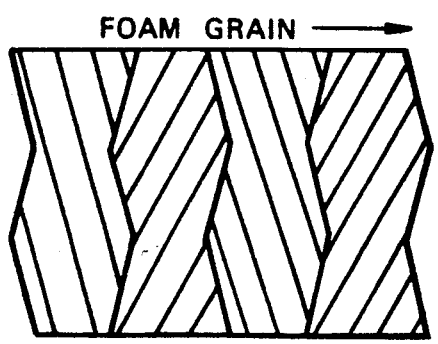
Figure 9:
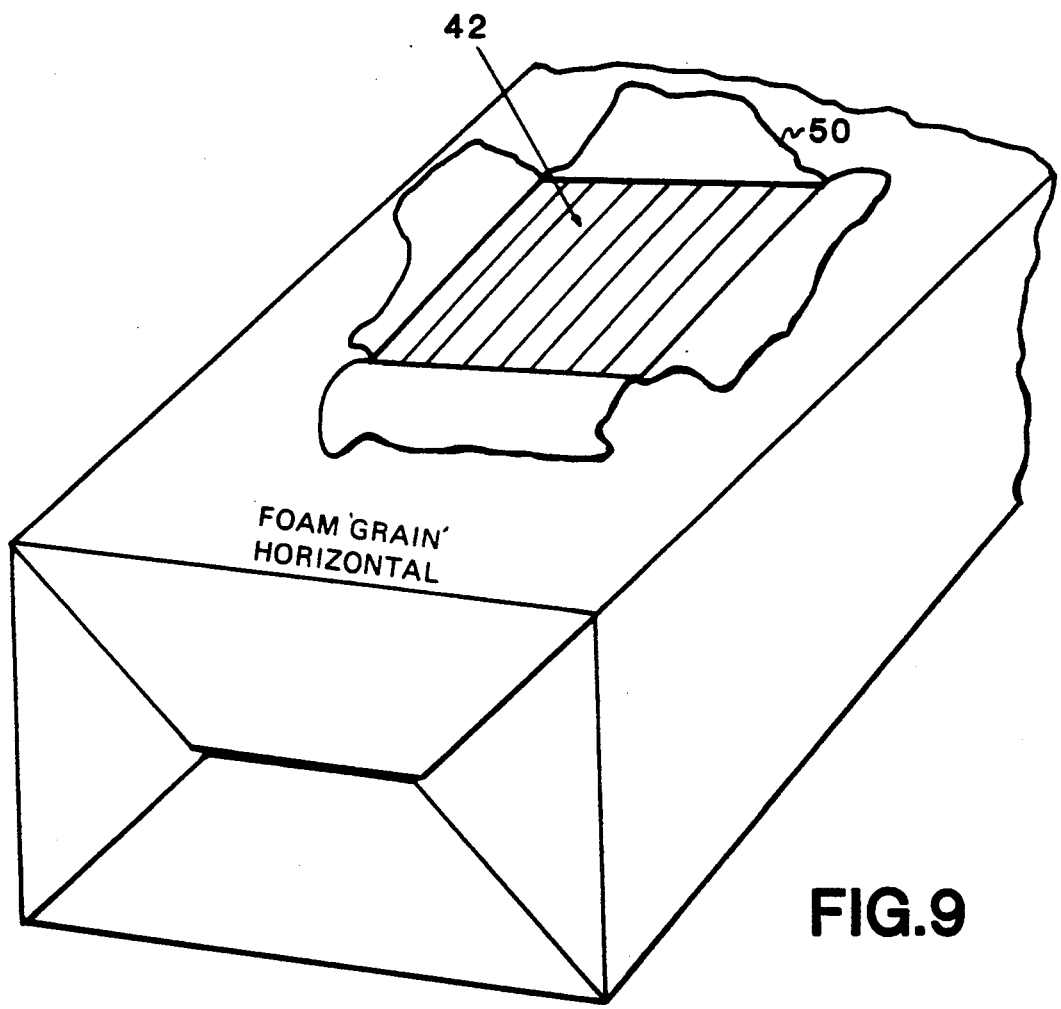

FIG. 7b corresponds to FIG. 6b;

FIG. 7c shows front and side views of the tool used in the operation of FIGS. 6 and 7;

FIG. 8a illustrates a composite block made from material strips in accordance with this invention;

FIGS. 8b, 8c and 8d are, respectively, a side view of a block before profiling, a side elevation showing the use of profiling platens or rollers and a side elevational view of the resulting profiled block of FIG. 8; and FIG. 9 is a perspective partial view of a further embodiment.

The present invention makes use of low desntiy, rigid, polyurethane foams having closed (uni-cellular) elongate cells. The elongation of the cells occurs uniform in a given plane within the material and, in effect, results in the material having an identifiable 'grain'. The term 'rigid' is one used commonly in the polyurethane industry and distinguishes a foam from a 'flexible' foam. A rigid polyurethane foam can either be open celled or closed celled, usually the latter, since the major uses of closed celled foam lies in insulation and buoyancy applications. A normal typical open cell rigid polyurethane has a density typically of the order of 32 kgs/m$^3$, its rigidity deriving from the physical properties on the polyurethane formulation itself.

By the term "low density" as used herein, we mean a foam having a density of the order of 5-12 kgs/m$^3$. Reduction of density to 5-12 kgs/m$^3$ dramatically reduces the physical properties of the polyurethane cell wall membranes. The apparent rigidity (or stiffness) is provided by gas trapped in the closed walls. If these cells are ruptured then the foam loses its stiffness and is then somewhat analogous to a flexible foam, with, however, very limited resilience and a very high compression set.

The stiffness of the original closed cell foam provides an aid to processing in that it facilitates cutting and perforation (as now described).

In accordance with the invention, low density rigid foam strip is perforated to at least partially break down the closed cell structure. This can be achieved by a number of means, two examples of which are illustrated in FIGS. 1 and 2.

Figure 1:
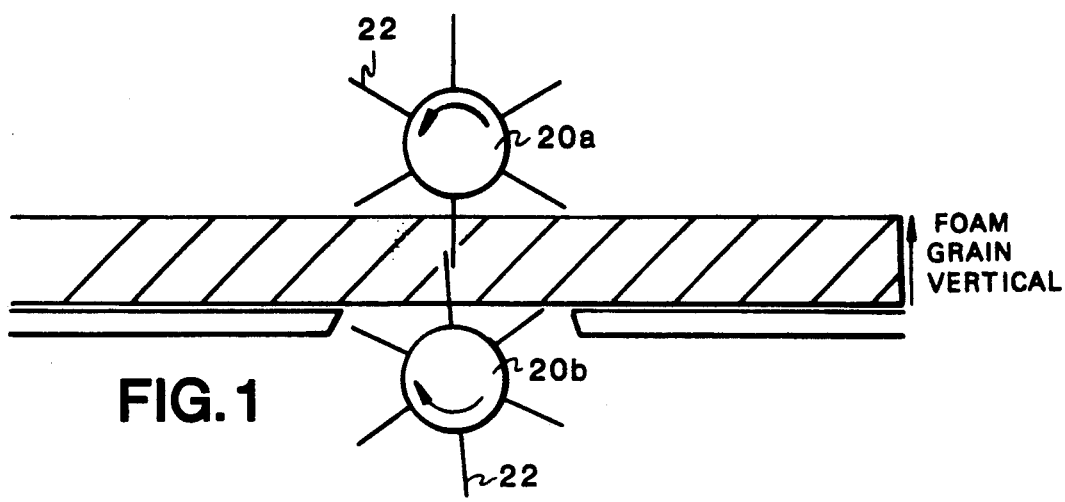
FIGS. 1 and 2 are diagrammatic illustrations showing two possible ways of forming a material in accordance with the present invention.

The mechanical perforation means illustrated in FIG. 1 comprises a pair of opposed rollers 20a, 20b, each carrying a plurality of radial pins 22. These pins are staggered between adjacent radial rows. In a typical example, the pins are staggered at 18 mm pitch. A strip of the low density foam is passed through the rollers which are rotated as indicated by the arrows. By this means the closed cells are progressively ruptured by the pins. The process of perforation/texturing may include passage of the foam through rollers, ensuring that substantially all cells are ruptured.

Figure 2:
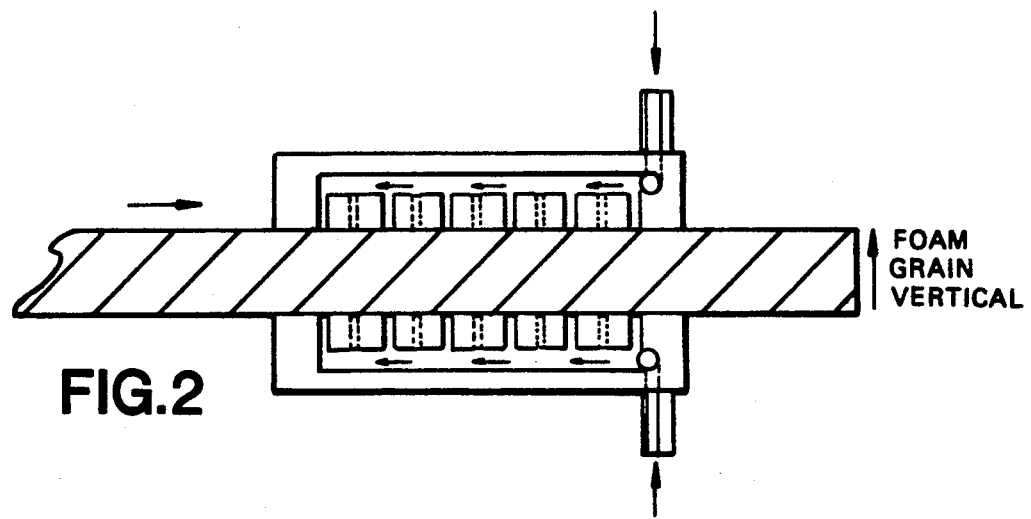

FIG. 2 shows a means of obtaining perforation pneumatically by pulsing jets of air at 100 psi into both sides of a strip of the low density foam in a predetermined pattern.

When the material thus formed is deformed into profiled containers having a volume less by a predetermined factor than that of the original foam to be introduced, the cells on the outer walls rupture first, so that an increase in density occurs differentially, and beneficially, on the outer surfaces of the foam in contact with the container walls. This densification is beneficial since the increased density exhibits a higher level of water absorption/retention in those areas away from the stem of the plant, as will be seen. Since nutrients are supplied in solution, nutrient salt concentrations will be at the highest in the enhanced density areas and lowest in the area around the plant stem. Also, the deformation of the foam when forced into a profiled container, given its high compression set, is permanent.

Thus, the starting point is a non-hydrophilic foam, which, by perforation/texturing, cell rupturing and subsequent densification, results in a hydrophilic foam providing a beneficial air:water ratio, with good water absorption, retention and drainage. Further water has to be readily available to the plants' roots. Very small pore sizes reduce availability because of surface tension; water contained in the larger voids is more readily available.

The perforation/texturing provides a series of what will become a pattern of voids on the surface of the resultant growing units, enhancing (in combination with the fine cells of the main foam structure) capillarity and water retention. Additionally, the structure of the growing units must allow for the free passage of emergent roots. Whilst the roots of plants which have a strong vigorous growth habit will readily penetrate the undensified areas of the foam, less vigorous roots would be impeded and growth stunted. Even vigorous roots however, cannot penetrate the densified areas, unless their passage is facilitated by the presence of passages provided by the perforating processes.

The pattern and depth of the perforations are designed so that for a given thickness of foam the surface is uniformly textured and the length of the spikes used for perforation/texturing carried on rollers on the upper and lower surfaces of the foam strip and their relative position is such that adequate passages for root growth are formed even after subsequent deformation.

Referring now to FIGS. 3 and 4, there is shown a means of using the present material to form multi-lobed propagation modules, comprising either three or four interconnected lobes, respectively. A strip 10 of low density polyurethane foam is moulded with vertical slots 12 and is perforated, for example by means of the apparatus of FIG. 1 or FIG. 2, over at least part of its height, as indicated by the dashes 13. A typical example might have a length of 85 mm, a thickness of 30 mm and a height of 40 mm, with slots 5 mm wide (exaggerated in the drawing). Thus, in the case of FIG. 3, the resulting member has three body portions 14a, 14b, 14c interconnected by narrow membrane portions 16a, 16b. In the case of the embodiment of FIG. 4, there are four body portions 14 and hence three membrane portions 16.

Figure 3A:
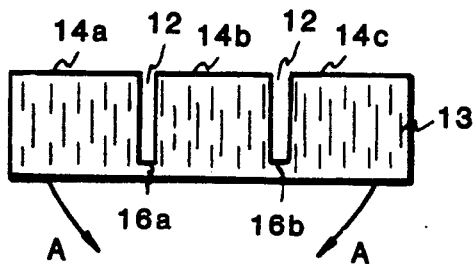
FIGS. 3a, 3b and 3c are diagrams illustrating the formation of a three-lobed module using a material in accordance with the present invention.
Figure 4A:
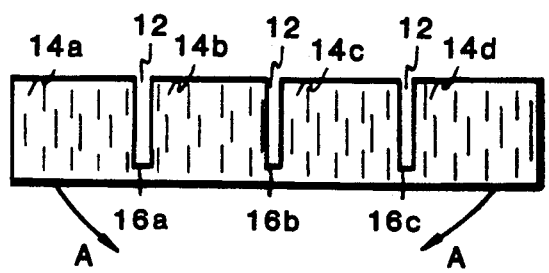
FIGS. 4a, 4b and 4c are diagrams illustrating the formation of a four-lobed module using a material in accordance with the present invention.
Figure 3B:
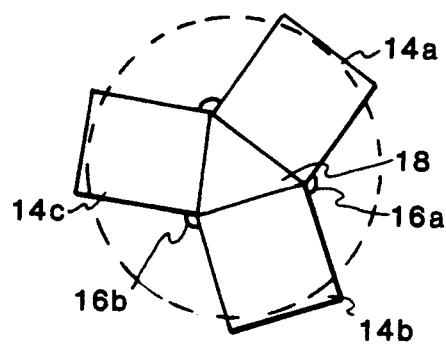
Figure 4B:
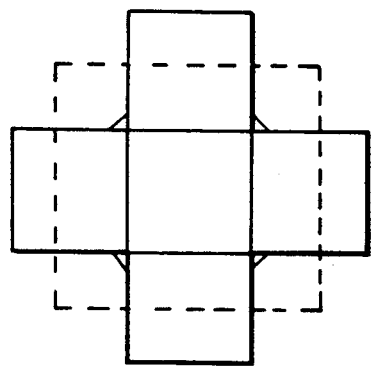
Figure 3C:
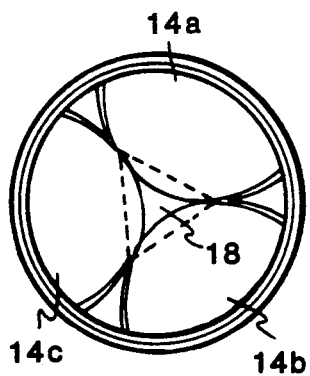
Figure 4C:
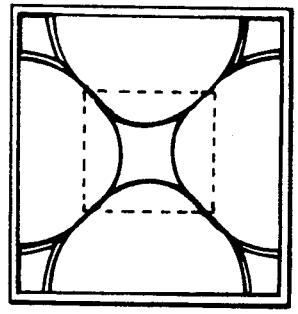

Placing the connecting membranes at the bottom as shown in FIGS. 3a and 4a, the outer body portions 14 are rotated inwardly (as shown by arrows A) until their inner surfaces are in intimate contact (see FIGS. 3b and 4b). The resultant assembly is then placed in, typically, a tray containing a multiplicity of tapered receptacles, typically 40 mm dia. ×40 mm deep, formed either by vacuum forming thermoplastics sheet or moulded in expanded polystyrene, one such assembly being placed into each receptacle. In introducing the modules into the receptacles, the module assemblies are deformed by the declension in cross-sectional area resulting from the taper in the receptacle's walls, so that they assume a shape approximately as shown in FIGS. 3c and 4c. Furthermore, in forcing the assemblies into the receptacles, any remaining closed cells tend to be ruptured, this deformation (given the high compression set of the material and its minimal modulus of elasticity) being permanent.

It will be appreciated that seedlings or cuttings introduced into the central region 18 of the assemblies prior to insertion into the receptacles will be firmly held in position therein in an ideal attitude for growing.

FIGS. 5 to 7 illustrate another use of the ruptured/textured material described above. A block 30 of foam is formed with two slots/slits 32a, 32b in opposite edges and is subjected to perforation as described above. A typical block size is 110 mm×41 mm ×25 mm. The slit foam block blank so formed is placed over a tapered recess of circular section of a vacuum formed tray beneath a tongue-like insertion tool 34 (see FIG. 7c) which can be displaced vertically. By lowering the tool 34, the blank is forced into the tray recess so that the opposite end surfaces 36a, 36b end up in a substantially horizontal plane level with the top of the recess, the two slots 32a, 32b and the join between the two ends of the block together defining a cruciform slot as shown in plan in FIG. 6a. [FIG. 7 shows the same situation in relation to a tapered recess of rectangular section]. Seedlings or plant cuttings can be introduced into such an arrangement to provide an ideal growing environment.

Root development is influenced and facilitated by the cruciform interstices provided in the growing units formed in the plastic trays. This construction has a number of other advantages. Firstly, the insertion of plant cuttings of widely differing stem diameters can be accommodated. Secondly, when a plant rooted in such a module is transplanted into compost, as the stem diameter increases the four upright segments will move outwards to accommodate. This latter is even more advantageous where a plantlet which subsequently forms a bulb is rooted in the growing units; initially the increase in volume at the base of the plant is taken up by foam densification, subsequently in earth or compost, further increase in volume displaces the vertical components outwards.

Plantlets raised by tissue culture methods, having been rooted in agar are already rooted, it can be seen that by partially removing the growing units from their container, the four vertical elements can be pushed apart to allow the roots to be accommodated, then, when the unit is pushed back into the tapered container, the plant stem and roots are held in place as the unit takes up its original shape.

It can be seen that the same method is equally of utility in facilitating the planting of large seeds and small bulbs or bubils. Insertion is easy, and as the foam is pushed back into its container, the foam surrounding the seed/bulb densifies to form an intimate interface with the plant material.

Another use of the material of the present invention is as a transplantation module wherein a block of the modified polyurethane material, e.g. 10 cm ×10 cm×8 cm, has a continuous sleeve of polythene film on its vertical planes and has a blind hole in its upper surface of typically 40 mm dia.×40 mm depth for receiving a plant rooted in a module of either 3 or 4 lobes as described above, and inserted into said blind bore.

A modification of this arrangement is shown in FIGS. 8a to 8d, wherein a foam block 40 is made up of a plurality of individual strips 42a, 42b, 42c, 42d, each of which is preformed from a plain strip of material (FIG. 8b) which is first perforated/textured as described above and then placed between a pair of heated profiled platens or rollers 44 so as to result in a plurality of straight-edged corrugations in the sides of the foam blank (FIG. 8c). A number of these profiled blanks are then put together as shown in FIG. 8d to result in the composite block of FIG. 8a. With this structure, the vertical interfaces of densified/perforated/textured profiled sheets enhance water "pick-up" and drainage. Foam "grain" at right angles to the interface increases water retention, as does the increase in surface area of the interfaces as a result of the interlocking profiles (FIG. 8d). The combination of vertical and horizontal channels facilitates root growth, as does foam perforation. The voids formed by perforation increase water available to the plant at the interface of the profiled sheets.

The foam's grain allows for the design of individual units of higher water retention where the grain is horizontal and enhance water drainage and absorption where the grain is vertical.

In the case of the foam block of FIG. 8a (which is typically 10 cms square and 7.5 cms high) a central hole is cut into the top end (typically 40 mm diam. and 40 mm deep) for receiving a growing unit as described in connection with FIGS. 3 and 4 or FIGS. 6 and 7. The block is surrounded by a polythene sleeve 48.

FIG. 9 shows another embodiment where a multiplicity of profiled foam sheets as illustrated in FIG. 8d are formed into a block and enclosed in polythene wrapping 50. The wrapping can then be renewed and a hole formed to receive the block of, for example, FIGS. 6 and 7. In a typical case, such a package might be 1 meter long, 17 cms wide and 10 cms high.

In another embodiment, sheets of polyurethane foam in accordance with the invention, e.g. 40 mm thick × 150 mm wide and up to 1M in length, are laid in successive layers to form the desired depth of a growing substrate, sealed in a container made of polythene film. In an alternative arrangement, the latter assembly is placed in a convenient moulded plastics tray, with the surface of the assembly covered by a sheet of polythene film.

In still further embodiments, modules of the material in accordance with the invention can be moulded oversize for subsequent deformation by insertion into a receptacle having, for example, circular or rectangular configurations.

A supporting substrate for the display of cut flowers and other plant materials can be formed, in that the upper surface and upper region of a block of low density polyurethane foam are unmodified for receiving the stems of the plant material, but with a lower portion (including the lower surface) of the block perforated in accordance with the present invention to enhance water retention and absorption in said lower portion, whilst maintaining a desirable lack of moisture around the stems of the plant material in the upper region.

A transplantation or seed propagating module can be formed by a sheet of the material of the present invention, which is rolled to form a module of a desired diameter, which is then placed in a container made of thin polythene film. Cuttings or seeds to be transported are placed below the upper surface of the module in the interstices between the layers of foam.

The latter arrangement can be modified by removing a portion of the centre of the upper surface to provide a blind hole, e.g. to form a recess 40 mm in dia. and 40 mm deep for receiving a plant grown in a module as described above (e.g. as shown in FIGS. 1 or 2).

The roll of material in the latter cases can be held by a narrow tape or cincture positioned around the centre of its periphery to prevent unravelling, the unit then being housed in a plastics container having a lid clipped over its open upper surface and having a convenient aperture to allow the stems of growing plants to pass.

I claim:

1. A block of rigid, substantially unicellular expanded polyurethane foam which has a density of 5–12 Kgs/M$^3$, said block having a thickness and being perforated through at least part of its thickness, the perforations resulting in a hydrophilic, heterocellular foam structure locally in the block, said hydrophilic, heterocellular foam structure defining groups of enlarged voids to facilitate water absorption and retention.

2. A plant propagation body formed of at least one foam block according to claim 1, and comprising at least three foam bodies disposed relative to one another to define a plant-receiving aperture therebetween.

3. A plant propagation body according to claim 2, comprising two end bodies and at least one intermediate body hingedly connected to the two end bodies along respective joint lines.

4. A plant propagation body according to claim 3, wherein said bodies are formed from a single block of the foam, a plurality of slots extending partly through the block to define foam membranes which interconnect adjacent bodies.

5. A plant propagation body formed of a rigid, substantially unicellular expanded polyurethane foam which has a density of 5–12 Kgs/M$^3$, said plant propagation body having a thickness and being perforated through at least part of its thickness, the perforations resulting in a hydrophilic, heterocellular foam structure locally in the body, said hydrophilic, heterocellular foam structure defining groups of enlarged voids to facilitate water absorption and retention, said body comprising at least three foam portions of generally cuboidal configuration and at least two foam membranes unitary with the body and hingedly interconnecting the cuboidal foam portions to one another.

6. A plant propagation body formed of a rigid, substantially unicellular expanded polyurethane foam which has a density in the range of 5–12 Kgs/M$^3$, said body having a thickness and being perforated through at least part of its thickness, the perforations resulting in a hydrophilic, heterocellular foam structure locally in the body, said hydrophilic heterocellular foam structure defining groups of enlarged voids to facilitate water absorption and retention, said body being formed from a single cuboidal block of said foam provided with two opposed, parallel slots extending into the foam block from opposed ends thereof, the foam having a grain which is substantially parallel to the plane containing said slots, the foam block being deformed about an axis perpendicular to the plane of each said slot to define a cruciform plant-receiving recess.

7. A plant propagation body according to claim 6, wherein said foam body is substantially cuboidal before deformation to form the cruciform recess, the slots being formed in opposite ends of the block.

8. A plant propagation body according to claim 6, wherein the foam defines a grain, and wherein before said block is deformed to form the cruciform recess, the foam grain is substantially parallel to the planes of said slots.

9. A plant propagation body formed of a plurality of laminated layers of foam, each said layer being formed of a rigid, substantially unicellular expanded polyurethane foam which has a density of 5–12 Kgs/M$^3$, each said layer having a thickness and being perforated through at least part of its thickness, the perforations resulting in a hydrophilic, heterocellular foam structure locally in each layer, said hydrophilic, heterocellular foam structure defining groups of enlarged voids to facilitate water absorption and retention.

10. A plant propagation body according to claim 9, wherein abutting surfaces of adjacent layers are provided with interengaging corrugations.

11. A plant propagation body formed of a plurality of laminated layers of foam, each said layer being formed of a rigid, substantially unicellular expanded polyurethane foam which has a density of 5–12 Kgs/M$^3$, each said layer having a thickness and being perforated through at least part of its thickness, the perforations resulting in a hydrophilic, heterocellular foam structure locally in each layer, said hydrophilic, heterocellular foam structure defining groups of enlarged voids to facilitate water absorption and retention, abutting surfaces of adjacent layers being provided with interengaging corrugations, the foam defining a grain, and wherein the foam grain is aligned substantially perpendicularly to the interfaces between said layers.

12. A plant propagation body formed a plurality of laminated layers of foam, each said layer being formed of a rigid, substantially unicellular expanded polyurethane foam which has a density of 5–12 Kgs/M$^3$, each said layer having a thickness and being perforated through at least part of its thickness, the perforations resulting in a hydrophilic, heterocellular foam structure locally in each layer, said hydrophilic, heterocellular foam structure defining groups of enlarged voids to facilitate water absorption and retention, the foam defining a grain and wherein the foam grain is aligned substantially perpendicularly to the interfaces between said layers.

13. A plant propagation body formed of a plurality of laminated layers of foam, each said layer being formed of a rigid, substantially unicellular expanded polyurethane foam which has a density of 5–12 Kgs/M$^3$, each said layer having a thickness and being perforated through at least part of its thickness, the perforations resulting in a hydrophilic, heterocellular foam structure locally in each layer, said hydrophilic, heterocellular foam structure defining groups of enlarged voids to facilitate water absorption and retention and including a substantially impervious membrane disposed about the periphery of said plurality of foam layers.

14. A plant propagation body according to claim 13, wherein said substantially impervious membrane encloses the whole of said foam layers.

15. A plant propagation body formed of a plurality of layers of foam, each said layer being formed of a rigid, substantially unicellular expanded polyurethane foam which has a density of 5–12Kgs/M$^3$, each said layer having a thickness and being perforated through at least part of its thickness, the perforations resulting in a hydrophilic, heterocellular foam structure locally in each layer, said hydrophilic, heterocellular foam structure defining groups of enlarged voids to facilitate water absorption and retention, and including an aperture formed in at least one of said plurality of foam layers for receiving a plant.

16. A supporting substrate for the display of cut flowers and other plant materials, comprising an upper layer of expanded plastics foam, and a lower layer of a rigid, substantially unicellular expanded polyurethane foam which has a density of 5–12 Kgs/M$^3$, each said layer having a thickness and being perforated through at least part of its thickness, the perforations resulting in a hydrophilic, heterocellular foam structure locally in said lower layer, said hydrophilic, heterocellular foam structure defining groups of enlarged voids to facilitate water absorption and retention.

* * * * *